Figure 1:
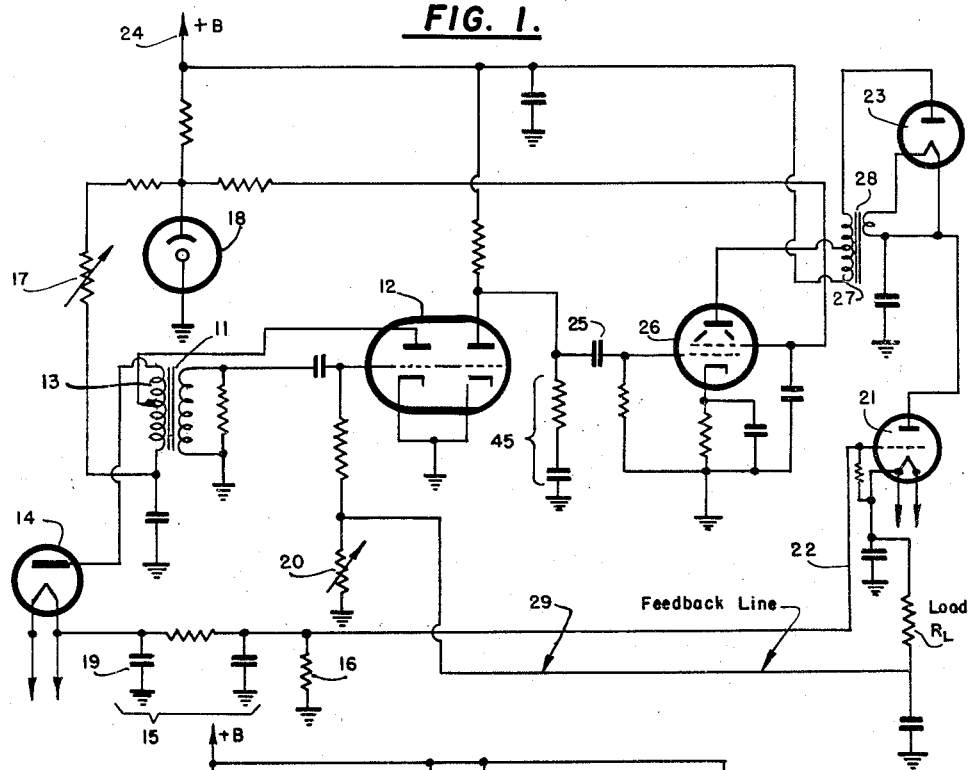

April 2, 1957 L. W. PARKER 2,787,753
VOLTAGE REGULATED POWER SUPPLY
Filed Jan. 5, 1955

INVENTOR
LOUIS W. PARKER
BY Moore & Hall
ATTORNEYS

United States Patent Office 2,787,753
Patented Apr. 2, 1957

2,787,753

VOLTAGE REGULATED POWER SUPPLY

Louis William Parker, Great Neck, N. Y.

Application January 5, 1955, Serial No. 479,887

14 Claims. (Cl. 321—2)

The present invention relates to electronic power supplies and is more particularly concerned with voltage regulators for use in such power supplies. The present invention comprises an improved form of high, direct voltage power supply of the type disclosed in my prior Patent No. 2,679,550, issued May 25, 1954, for: "Television Receiver With Regulated High Voltage Power Supply."

As was discussed in my prior patent, identified above, various circuits often require a high direct voltage power supply which is self regulating and self compensating for load variations. While a number of such self regulating power supplies are already known, the system of my prior Patent No. 2,679,550 was found to be far more economical than other conventional systems known to that time. In general, the improved form of voltage regulated power supply of my said prior patent comprises an arrangement utilizing a grid controlled vacuum tube wherein the load is coupled to the cathode of the said tube so that it functions as a cathode follower. The anode of the tube is energized by a first source of direct voltage which is unregulated, other than by a line voltage regulator, and the grid of the said vacuum tube is supplied by a source of regulated direct voltage, separate and distinct from that supplied to the said anode. By utilizing these two distinct direct voltage sources, one of which is applied to the anode and the other to the grid of a cathode follower arrangement, it was found that the power taken by the load is drawn almost entirely from the unregulated anode source whereby variations in the load impedance have substantially no effect on the grid voltage supply. Consequently, by utilizing this arrangement the grid voltage of my basic high voltage power supply remains substantially unchanged by variations in load, whereby changes in the load voltage itself are reduced to a very low magnitude. Reference is made to my prior Patent No. 2,679,550 for the precise manner in which the foregoing arrangement may be effected, and this prior patent, and the structure taught therein, is incorporated in the present application by reference.

While the foregoing method of voltage regulation does in fact comprise a substantial improvement over conventional high voltage power supplies, it has been found that, while the amount of regulation obtainable is entirely sufficient for most applications, it is not as high as is sometimes possible with conventional systems when a high gain amplifier is employed to amplify small variations in the regulated voltage. The present invention accordingly provides an improved form of high voltage power supply, of the type described previously, wherein the regulation is as good or better than that presently obtainable with more expensive forms of regulator circuits. It should further be noted that the regulated power supply of the present invention effects this improved regulation without adding appreciably to the cost or complexity of the relatively simple structure described in my prior U. S. Patent No. 2,679,550.

It is accordingly an object of the present invention to provide an improved high direct voltage power supply that is self-regulating to compensate for load variations.

Another object of the present invention resides in the provision of a power supply in which regulation is effected by electronic means or by a combination of electromagnetic and electronic means.

A still further object of the present invention resides in the provision of a relatively inexpensive high voltage regulated power supply wherein the regulation obtained is as good or better than that presently obtainable with more expensive forms of regulator circuits.

Still another object of the present invention resides in the provision of a voltage regulated power supply wherein substantially perfect stable operation is obtainable over a predetermined and adjustable range.

In effecting the foregoing objects and advantages of the present invention, a voltage regulated power supply is provided which utilizes a cathode follower stage having separate sources of D. C. excitation applied to the anode and grid thereof. The load current is utilized in various ways to raise the voltage applied to the grid of the said cathode follower stage by a small amount, in dependence upon variations in the said load current. By utilizing such an arrangement, any slight drop of voltage resulting from an increased load current is in turn compensated by an opposing change in the grid voltage of the said cathode follower stage whereby compensation for such changes in load current may be effected over a predetermined range, thereby to provide improved regulation over the said range.

It is, of course, possible to over-compensate for variations in load current so that increasing load current will in fact increase load voltage, and if this is done in excess a high degree of oscillation may result. However, in accordance with the present invention, the compensation may be adjusted to a point of operation whereby perfectly stable operation is obtained wherein no appreciable load voltage change occurs with changes in load current. It has been found that perfect regulation is in fact obtainable over a limited range of load currents; and it has been further found that the operation of the improved form of voltage regulator of the present invention is far superior, over that limited range, to any conventional form of voltage regulator, and is in fact as good, even though not perfect, as conventional voltage regulators over the entire operating range.

In accordance with the present invention, a source of oscillations, for instance a blocking oscillator or a sine-wave oscillator, is utilized. Load current variations are caused to so control the operation of the said oscillator that either its frequency is varied or its plate voltage is altered in a proper direction to compensate for variations in load current. The oscillator is in turn employed to supply drive to the separate D. C. excitation sources applied to the anode and grid of a cathode follower stage, in accordance with the preceding discussion.

Figure 2:
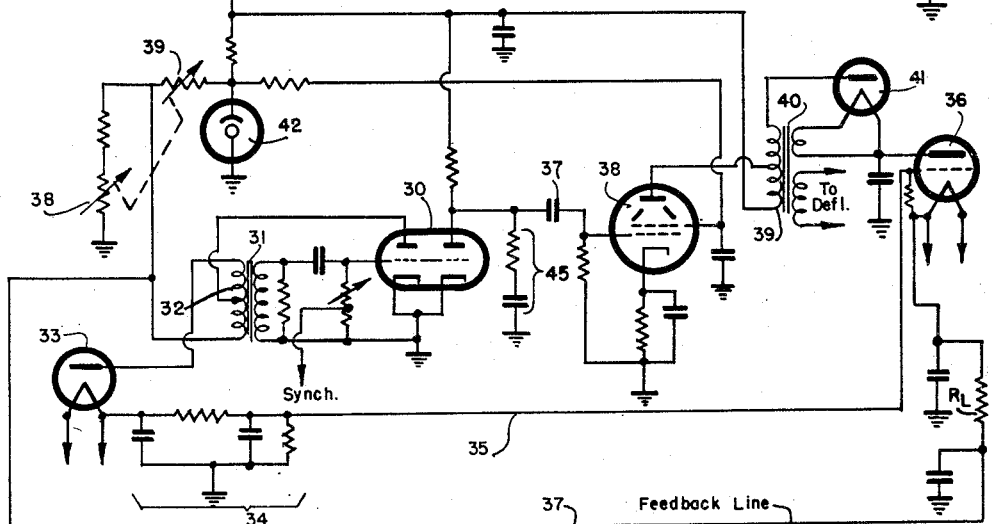

The foregoing objects, advantages, construction and operation of the present invention will be more readily seen from the following discussion and accompanying drawings, in which:

Figure 1 is a schematic diagram of a voltage regulated power supply of general utility, in accordance with the present invention; and Figure 2 is a schematic diagram of a voltage regulated power supply in accordance with the present invention, such as may be utilized in television receivers.

Referring now to the arrangement shown in Figure 1, it will be seen that a grid controlled vacuum tube 21 is provided, having a load R_L connected in the cathode circuit thereof, whereby the said tube 21 functions as a cathode follower. The grid of the cathode follower stage 21 is supplied, via a line 22, with a source of D. C. voltage, and the anode of the said stage 21 is supplied with a further source of direct voltage from the output of a rectifier 23. The control tube 21 is also supplied with a grid leak, as shown, between the grid and cathode thereof. This grid leak may be of the order of 10 megohms and, due to the relatively low voltage difference across it, will pass only a few microamperes. Its use is nevertheless advisable in the case of a tube having grid emission or gas.

A conventional blocking oscillator is also provided comprising a transformer 11 and a vacuum tube 12, which may take the form of a double triode having common cathode and grid connections, and the said blocking oscillator is in turn energized from a source 24 of positive potential. In accordance with the present invention, the transformer 11 includes an extra winding 13 which is utilized to transform pulses generated by the said blocking oscillator 12 to a desired high value of voltage. The pulses generated by the said blocking oscillator 12, and transformed by the winding 13 of transformer 11, are coupled to the anode of a rectifier 14 either directly as shown or via an amplifier similar to 26 (to be described) and are rectified thereby to provide a source of pulsating D. C. voltage at the cathode of the said rectifier 14. The pulsating D. C. output of the rectifier 14 is then filtered to a reasonably pure D. C. by an RC filter 15 having an input capacitor 19; and the output of the said filter 15 is taken across a bleeder resistor 16, hence it may be fed via line 22 to the grid of the cathode follower stage 21.

As will be seen from an examination of the circuit of Figure 1, the only load on the rectified D. C. output, appearing at the output of RC filter 15, is that taken by the bleeder resistor 16 but, inasmuch as the bleeder resistance is of a very high value, the load so taken represents but a small fixed load. A regulator tube 18 is further connected as shown, between the source of positive potential 24 and ground, thereby practically to eliminate the effect of line voltage variations on the output potential of RC filter 15. A variable impedance 17 is further inserted between the said source of supply 24 and one end of the winding 13 of transformer 11 to provide means for adjusting the output voltage of filter 15. The D. C. output thus appearing on line 22 and fed to the grid of cathode follower stage 21 represents a first source of direct voltage, which source of voltage is normally substantially independent of variations in load current.

The output of blocking oscillator 12 is fed to a sawtooth waveforming network 45 and, via a capacitor 25, is also fed to the grid of a power amplifier 26. The output of the said amplifier 26 is coupled to a winding 27 of output transformer 28. As may be seen from Figure 1, the transformer winding 27 is connected as an auto-transformer, thereby to provide a stepped-up voltage which is in turn supplied to the anode of further rectifier 23, and this rectifier 23, as was discussed previously, has its cathode connected to the anode of cathode follower stage 21, thereby to provide a second source of D. C. voltage for the anode of the said cathode follower stage. Thus, the arrangement shown, comprising a first source of D. C. voltage coupled via line 22 to the grid of cathode follower stage 21, and a further source of D. C. voltage coupled to the anode of cathode follower stage 21, permits the load R_L to draw substantially all of its power from the anode supply of stage 21 without substantially affecting the grid potential applied to the stage 21 via line 22.

Even though quite good regulation is effected by the foregoing arrangement, it has nevertheless been found that an increase in load current through R_L will still effect a small decrease in load voltage, and that accordingly the regulation obtainable is something less than perfect. In accordance with the several modifications of the present invention, however, substantially perfect regulation may in fact be obtained over a predetermined operating range and improved regulation is obtained over the remainder of the operating range.

Referring once more to the arrangement of Figure 1, it should be noted that inasmuch as the input capacitor 19 of RC filter 15 is chosen to exhibit a relatively low capacity value, the D. C. voltage appearing across bleeder resistance 16 is not as high as the peak voltage applied to the said input capacitor 19. Consequently, if the number of pulses per second applied to the RC filter 15 should be increased, this increase in pulse rate has the effect of increasing the voltage across bleeder 16 even though individual pulses are no higher in amplitude than before. The reason for this effect is that less time is permitted for the input capacitor 19 to discharge when the pulse rate applied thereto is increased, whereby the said input capacitor will not discharge to as low a value, prior to application of the next following applied pulse, as would be the case with a lesser pulse rate. Thus, variation in pulse rate applied to the RC filter 15 will in turn effect a variation in D. C. voltage appearing at the grid of cathode follower stage 21 via line 22.

This concept is utilized in accordance with one form of the present invention to compensate for even small changes in load voltage due to variations in load current in the load R_L, and such compensation is effected by causing load current passing through the said load R_L to pass also through a feedback line 29, and thence through a variable resistor 20 to ground. As will be seen from an examination of Figure 1, the said resistance 20 is coupled to the grid of blocking oscillator stage 12 whereby variations in load current will in turn vary the positive bias applied to the said blocking oscillator 12. Thus, if the load current in R_L should increase (which increase would in turn tend to decrease slightly the load voltage), this increased load current causes an increased drop to appear across the small resistance 20 thereby raising the positive bias applied to blocking oscillator 12, increasing the repetition rate of the said blocking oscillator 12 and in turn increasing the voltage magnitude output appearing from RC filter 15 across bleeder 16 and applied via line 22 to the grid of cathode follower stage 21. The increased voltage on line 22 will in turn tend to increase the voltage across load R_L thus compensating for variations in load voltage due to variations in load current, and making the voltage across the load R_L substantially independent of load impedance and load current variation over a given range.

It should be noted that over a predetermined range, which may be controlled by proper adjustment of the resistor 20, the regulation effected by the system shown in Figure 1 is substantially perfect, and even outside this predetermined range, load voltage variations are reduced substantially from the value they would have without compensation. As a practical matter, the variation in bias voltage applied via line 22 to the grid of cathode follower stage 21 is relatively low for proper compensation, and is in the order of only two volts variation with most oscillator tubes and voltages, even though operation in the kilovolt range is required of the power supply.

As will be seen from the foregoing discussion, one form of voltage compensation in accordance with the present invention is effected by varying the repetition rate of a blocking oscillator in response to variations in load current. While such a circuit finds general utility, it should be noted that when the power supply shown is to be utilized in a television system, the blocking oscillator in question is often employed for supplying the deflection voltages in such a television system. Thus, in the case of television type surge power supplies, the blocking oscillator provided is normally locked in synchronism with a received picture signal and the repetition rate of the said oscillator cannot therefore be varied without adversely affecting the operation of the remainder of the system. The concepts of the present invention may nevertheless be employed in regulated power supplies for use in television systems, and in this respect variations in load current may be employed to vary the plate voltage of the said blocking oscillator rather than the grid voltage and repetition rate thereof. Such an arrangement is shown in Figure 2 and the arrangement to be described in reference thereto finds particular utility in television type power supplies.

Referring now to Figure 2, it will be seen that the power supply circuit shown therein is substantially identical with that previously described in reference to Figure 1. A blocking oscillator 30 is provided as before, and this oscillator includes a transformer 31 having an auxiliary winding 32 coupled to the anode of a rectifier 33, the cathode of which is connected to an RC filter 34, and thence via a line 35 to the grid of a cathode follower stage 36. The output of the said blocking oscillator 30 is further coupled via a capacitor 37 to the grid of a power amplifier 38, the output of which amplifier is in turn fed to a winding 39 of an auto-transformer 40, which winding 39 supplies high voltage pulses to a rectifier 41, and thence to the anode of the said cathode follower stage 36. In these particulars, therefore, the circuit provided is the same as that shown and described in reference to Figure 1.

Current flowing through the load $R_L$ connected to the cathode of stage 36 passes via a feedback line 37, and part of this load current also passes through a variable resistor 38 to ground, whereby variations in load current through the load impedance $R_L$ effect corresponding variations in the voltage across the said variable resistor 38. If the load current should in fact increase, the voltage across resistor 38 will be correspondingly increased and this increased voltage across the resistor 38 will in turn tend to reduce the current flowing through a variable resistor 39 connected between one end of transformer winding 32 and the source of +B supply shown. This decrease of current flow through variable resistor 39 will in turn decrease the voltage drop across the said resistor 39 whereby the plate potential of blocking oscillator 30 supplied via the other end of transformer winding 32 will be increased thereby to increase in magnitude the output potential of the said blocking oscillator 30. Thus once more, compensation in load voltage is obtained, inasmuch as an increase in load current is utilized to increase the anode potential of blocking oscillator 30, which increase in anode potential in turn effects an increased output from the said blocking oscillator thereby to increase the grid voltage on the cathode follower stage 36 via rectifier 33, RC filter 34 and line 35.

In the particular example shown in Figure 2, the voltage taken from the load voltage and appearing across the variable resistor 38 for purposes of compensation, is preferably in the order of 100 volts. The degree and range of compensation may be varied by varying the adjustment of resistors 38 and 39 and these latter resistors may in turn be ganged together so as to represent only one adjustment for compensation.

As was mentioned previously, the compensation methods described in reference to Figures 1 and 2 apply to load voltage variation resulting primarily from variation in load impedance. Line voltage variation is, of course, not compensated by the arrangement shown, but such line voltage variations may be greatly minimized by regulating the plate supply voltage of the blocking oscillator tubes 12 and 30, and the screen supply voltages of the output power amplifiers 26 and 38 by gas regulators such as 18 and 42. It should further be noted that although the heater supplies for the several tubes have not been shown, inasmuch as these may be conventional, it is also desirable, for increased regulation, to use a ballast tube regulator in series with these heaters, and in particular, in series with the heaters of the oscillator tubes 12 and 30.

While I have described preferred embodiments of my invention, it must be understood that the foregoing description is meant to be illustrative only and is not limitative of my invention. Thus, while the foregoing discussion has been concerned with high voltage power supplies utilizing blocking oscillators, it must be stressed that each of the compensation arrangements shown in Figures 1 and 2 are equally applicable to sinewave oscillator type power supplies, and this latter arrangement is meant to fall within the scope of the present invention. Many further variations will be suggested to those skilled in the art, and all such variations are intended to fall within the scope of the present invention, as set forth in the appended claims.

Having thus described my invention, I claim:

1. A constant voltage power supply comprising a load, a source of alternating current of higher peak potential than that to be applied to said load, said source of alternating current including an oscillator originating said alternating current, a rectifier for rectifying the output of said source, an electron discharge device having an anode, a cathode and a grid, means connecting said anode to the positive side of said rectified output, means connecting said load to said cathode, a source of direct current potential including said oscillator, said direct current source being separate from said rectified output and having a steady potential of substantially the same value as the operating potential of said load, means coupling the positive side of said direct current potential source to said grid, and control means responsive to variations in current through said load for varying the output of said oscillator thereby to vary the magnitude of said source of direct current potential.

2. The power supply of claim 1 in which said control means includes means for changing the repetition rate of said oscillator.

3. The power supply of claim 1 in which said control means include means for varying the magnitude of output potential of said oscillator.

4. A power supply comprising an oscillator including a first discharge device having first transformer means coupled thereto, first rectifier means coupled to a winding on said first transformer means for obtaining a first substantially steady direct current potential, a second discharge device comprising an anode, a cathode and a grid, means coupling the output of said first rectifier means to said grid, load means connected to the cathode of said second discharge device whereby said second discharge device operates as a cathode follower, a source of alternating current, means including second transformer means and second rectifier means coupled to said source of alternating current for obtaining a second direct current potential substantially independent of said first direct current potential, means coupling said second direct current potential to the anode of said second discharge device, and control means responsive to variations in current through said load for varying the magnitude of said first direct current potential.

5. The power supply of claim 4 wherein said oscillator is a blocking oscillator.

6. The power supply of claim 4 wherein said source of alternating current comprises an amplifier coupled to said oscillator, said second transformer means comprising an auto-transformer coupled to said second rectifier means, the output of said amplifier being coupled to the input winding portion of said auto-transformer.

7. The power supply of claim 5 wherein said control means includes means for varying the repetition rate of said blocking oscillator.

8. The power supply of claim 5 wherein said control means includes means for varying the magnitude of output potential of said blocking oscillator.

9. The power supply of claim 5 wherein said blocking oscillator comprises the deflector generator for a cathode ray tube system, said control means including means for varying the anode potential of said first discharge device.

10. A power supply comprising a blocking oscillator including a first discharge device having an anode, a cathode and a grid, first transformer means having a first winding coupled to the grid and a second winding coupled to the anode of said first discharge device, a third winding on said first transformer means, first rectifier means having its anode connected to said third winding of said first transformer means, filter means coupled to the cathode of said first rectifier means to obtain a first substantially steady direct current potential, amplifier means coupled to said blocking oscillator, second transformer means having an input connected to the output of said amplifier means, second rectifier means connected to an output of said second transformer means thereby to obtain a second direct current potential substantially independent of said first direct current potential, a second discharge device having an anode, a cathode and a grid, means coupling the output of said filter means to the grid of said second discharge device, means coupling the output of said second rectifier means to the anode of said second discharge device, load means coupled at one of its ends to the cathode of said second discharge device whereby said second discharge device operates substantially as a cathode follower, impedance means coupled to the other end of said load thereby to effect a control potential dependent upon the magnitude of current flowing through said load means, and means coupling said impedance means to one of the electrodes of said first discharge device whereby said control potential varies the output of said blocking oscillator in response to variations in current flowing through said load means.

11. The power supply of claim 10 wherein said filter comprises a resistance-capacitance network having a capacity input of relatively low capacitance, said impedance means being coupled to the grid of said first discharge device thereby to control the bias on said grid and the output repetition rate of said blocking oscillator.

12. The power supply of claim 11 wherein said impedance means is variable.

13. The power supply of claim 10 wherein said impedance means is coupled to the anode of said first discharge device thereby to control the anode potential of said first discharge device and the magnitude of output potential of said blocking oscillator.

14. The power supply of claim 13 wherein said impedance means is variable.

References Cited in the file of this patent
UNITED STATES PATENTS

| | | |
|---|---|---|
| 2,565,621 | Olson | Aug. 28, 1951 |
| 2,573,744 | Trucksess | Nov. 6, 1951 |
| 2,683,852 | Sampson | July 31, 1954 |
| 2,700,747 | Finkelstein | Jan. 25, 1955 |